(12) United States Patent
Charbit et al.

(10) Patent No.: US 8,818,861 B2
(45) Date of Patent: Aug. 26, 2014

(54) FINDING MOBILE STATION FOR DEVICE-TO-DEVICE COMMUNICATION

(75) Inventors: Gilles Charbit, Hampshire (GB); Tao Chen, Salo (FI)

(73) Assignee: Nokia Corporation, Espoo (FI)

( * ) Notice: Subject to any disclaimer, the term of this patent is extended or adjusted under 35 U.S.C. 154(b) by 85 days.

(21) Appl. No.: 13/122,404

(22) PCT Filed: Sep. 30, 2009

(86) PCT No.: PCT/IB2009/007008
§ 371 (c)(1), (2), (4) Date: Apr. 1, 2011

(87) PCT Pub. No.: WO2010/038139
PCT Pub. Date: Apr. 8, 2010

(65) Prior Publication Data
US 2011/0191187 A1      Aug. 4, 2011

Related U.S. Application Data

(60) Provisional application No. 61/101,986, filed on Oct. 1, 2008.

(51) Int. Cl.
*G06Q 30/00* (2012.01)
*G06Q 30/02* (2012.01)

(52) U.S. Cl.
CPC ........ *G06Q 30/0267* (2013.01); *G06Q 30/0261* (2013.01); *G06Q 30/0207* (2013.01)
USPC ..................... 705/14.64; 705/14.58; 705/14.1

(58) Field of Classification Search
USPC ...................................................... 705/14.64
See application file for complete search history.

(56) References Cited

U.S. PATENT DOCUMENTS 5,343,512 A * 8/1994 Wang et al. .................... 455/410
5,987,421 A * 11/1999 Chuang ........................ 705/7.24

(Continued)

FOREIGN PATENT DOCUMENTS

EP    1313270 A2    5/2003
EP    1480386 A2    11/2004

(Continued)

OTHER PUBLICATIONS

"3GPP TS 45.010 V6.0.0 (Apr. 2003) Technical Specification", 3rd Generation Partership Project Organizational Partners, Valbonne, France, 2003.*

(Continued)

*Primary Examiner* — John G Weiss
*Assistant Examiner* — Scott C Anderson
(74) *Attorney, Agent, or Firm* — Mintz, Levin, Cohn, Ferris, Glovsky & Popeo, P.C.

(57) ABSTRACT

According to one example, a method may comprise receiving, by an advertising mobile station in a wireless network, a master profile message from an access node, the master profile message comprising, for each of a plurality of mobile stations in the wireless network, a timing parameter and at least one profile element; selecting at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement; sending a location request message to the at least one receiving mobile station; receiving the location message from the at least one receiving mobile station, the location message indicating a location of the at least one receiving mobile station.

14 Claims, 7 Drawing Sheets

(56) References Cited

U.S. PATENT DOCUMENTS

| | | | |
|---|---|---|---|
| 6,332,127 B1 * | 12/2001 | Bandera et al. | 705/14.55 |
| 7,308,266 B2 | 12/2007 | Du et al. | |
| 2004/0107283 A1 | 6/2004 | Paddon | |
| 2004/0203923 A1 | 10/2004 | Mullen | |
| 2006/0148502 A1 | 7/2006 | Korneluk et al. | |
| 2007/0160004 A1 | 7/2007 | Sakhpara | |
| 2007/0195731 A1 | 8/2007 | Camp, Jr. | |

FOREIGN PATENT DOCUMENTS

| | | |
|---|---|---|
| EP | 1480386 A2 | 11/2004 |
| GB | 2430281 A | 3/2007 |
| WO | WO-2005060182 A1 | 6/2005 |
| WO | WO-2006117558 A1 | 11/2006 |
| WO | WO-2008022338 A2 | 2/2008 |

OTHER PUBLICATIONS

"Understanding General Packet Radio Service (GPRS), Application Note 1377", Agilent Technologies, Jun. 28, 2001.*

Wechsler, "The Role of GPS in Precise Time and Frequency Dissemination", GPSWorld, Jul./Aug. 1990.*

Extended European Search Report dated Mar. 20, 2012, European Application No. 09817344.6, 7 pages.

PCT International Search Report dated Feb. 1, 2010 for PCT application No. PCT/IB2009/007008.

3GPP TS 36.300, v.8.4.0, "Evolved Universal Terrestrial Radio Access (E-UTRA) and Evolved Universal Terrestrial Radio Access (E-UTRAN)", Apr. 2008.

GP-021932, "Draft TR Feasibility Study on Uplink TDOA in GSM and GPRS (Release 6)", 3GPP TSG Geran #10, Jun. 2002.

GP-022138, "Update to 3GPP TS 22.071 for United States specific location accuracy requirements for US implementations", 3GPP TSG-Geran meeting #11, Aug. 2002.

Nokia Chat Service, <http://www.nokia.com/betalabs/chat>, downloaded from the Internet on Feb. 26, 2014.

"Global Positioning System", WiKiPedia, <http://en.wikipedia.org/wiki/Global_Positioning_System>, downloaded from the Internet on Feb. 26, 2014.

* cited by examiner

FINDING MOBILE STATION FOR DEVICE-TO-DEVICE COMMUNICATION

RELATED APPLICATION

This application was originally filed as PCT Application No. PCT/IB2009/007008 filed Sep. 30, 2009, which claims priority benefit from U.S. Patent Application No. 61/101,986, filed Oct. 1, 2008.

TECHNICAL FIELD

This description relates to wireless networks.

BACKGROUND

In wireless networks, mobile stations may communicate with an access node, which may relay data to other mobile stations. At times, one mobile station user may desire to send a message to another mobile station user.

SUMMARY

According to one example embodiment, a method may comprise receiving, by an advertising mobile station in a wireless network, a master profile message from an access node, or from an access-node designated group master mobile station, the master profile message comprising, for each of a plurality of mobile stations in the wireless network, a timing parameter and at least one profile element. The method may also comprise selecting at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement. The method may also comprise sending a location request message to the at least one receiving mobile station. The method may also comprise receiving the location message from the at least one receiving mobile station, the location message indicating a location of the at least one receiving mobile station.

According to another example embodiment, a method may comprise sending, by a receiving mobile station in a wireless network, a receiving mobile station profile message to an access node, the receiving mobile station profile message including at least one profile element. The method may also comprise receiving, from an advertising mobile station, a location request message. The method may also comprise sending, in response to the receiving the location request message, a location message to the advertising mobile station, the location message indicating a location of the receiving mobile station.

According to an example embodiment, an apparatus may comprise a controller and a transceiver. The controller may be configured to process a master profile message received from an access node or from an access-node designated group master mobile station, the master profile message comprising, for each of a plurality of mobile stations in the wireless network, a timing parameter and at least one profile element, select at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement, generate a location request message for the at least one receiving mobile station, and process the location message received from the at least one receiving mobile station, the location message indicating a location of the at least one receiving mobile station. The transceiver may be configured to send messages generated by the controller and receive and forward messages to the controller.

According to an example embodiment, an apparatus may comprise a controller and a transceiver. The controller may be configured to generate a receiving mobile station profile message for an access node, the receiving mobile station profile message including at least one profile element, process a location request message received from an advertising mobile station, and generate, in response to processing the location request message, a location message for the advertising mobile station, the location message indicating a location of the receiving mobile station. The transceiver may be configured to send messages generated by the controller and receive and forward messages to the controller.

According to an example embodiment, a computer program product for device-to-device communication between mobile stations may be tangibly embodied on a computer storage medium. The computer program product may include executable code that, when executed, is configured to cause an advertising mobile station to receive, by the advertising mobile station in a wireless network, a master profile message from an access node, or from an access-node designated group master mobile station, the master profile message comprising, for each of a plurality of mobile stations in the wireless network, a timing parameter and at least one profile element, select at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement, send a location request message to the at least one receiving mobile station, and receive the location message from the at least one receiving mobile station, the location message indicating a location of the at least one receiving mobile station.

According to an example embodiment, a computer program product for device-to-device communication between mobile stations may be tangibly embodied on a computer storage medium. The computer program product may include executable code that, when executed, is configured to cause an advertising mobile station to send, by the receiving mobile station in a wireless network, a receiving mobile station profile message to an access node, the receiving mobile station profile message including at least one profile element, receive, from an advertising mobile station, a location request message, and send, in response to the receiving the location request message, a location message to the advertising mobile station, the location message indicating a location of the receiving mobile station.

The details of one or more implementations are set forth in the accompanying drawings and the description below. Other features will be apparent from the description and drawings, and from the claims.

DETAILED DESCRIPTION

Figure 1A:
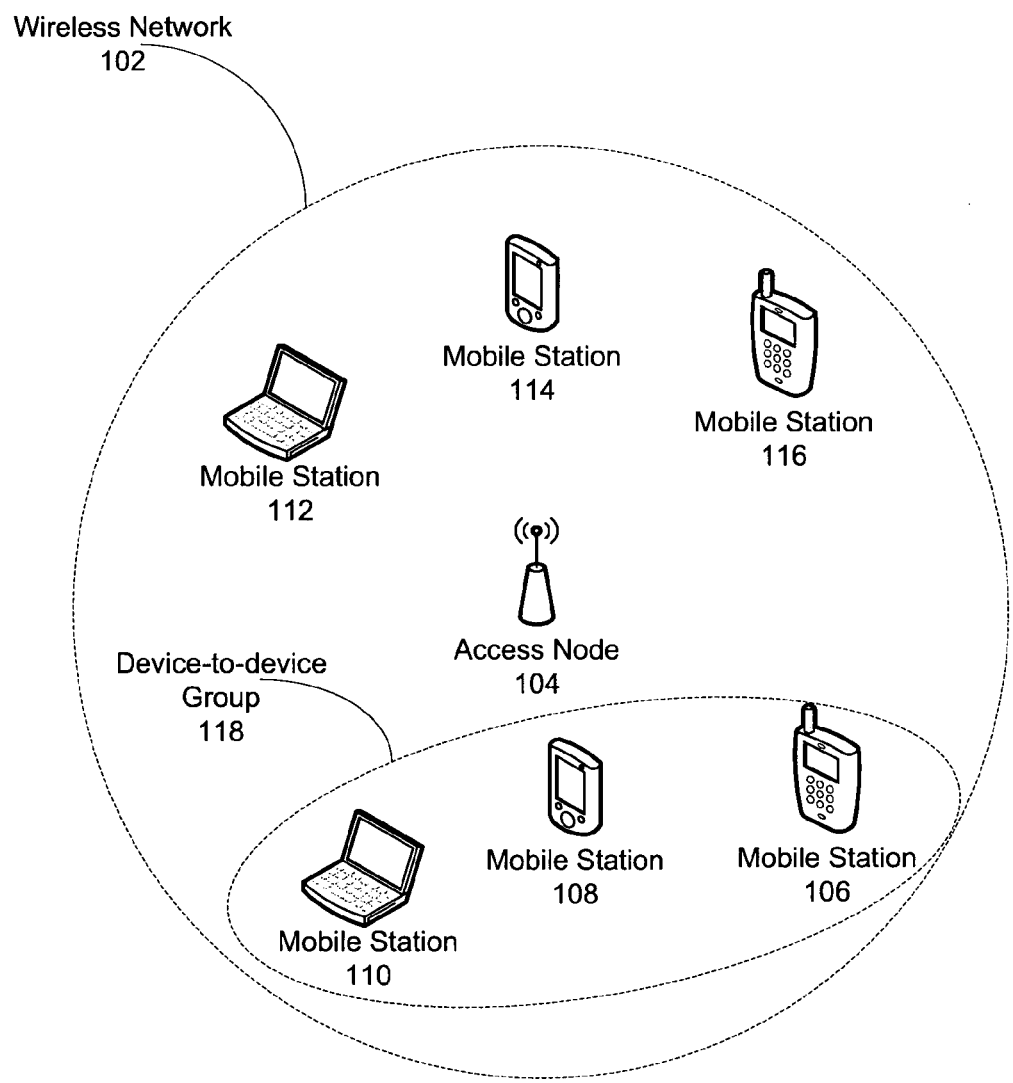
FIG. 1A is a diagram of a wireless network according to an example embodiment.

FIG. 1 is a block diagram of a wireless network 102 according to an example embodiment. The wireless network 102 may include a long term evolution (LTE) network using an evolved UTRA (EUTRA) air interface, an IEEE 802.11 wireless local area network (WLAN), an IEEE 802.16 Worldwide Interoperability for Microwave Access (WiMAX) network, or a cellular telephone network, according to example embodiments.

The wireless network 102 may include an access node 104. The access node 104 may include an LTE node B, such as an enhanced node B, a WLAN access point, a WiMAX base station, or a cellular telephone base station, according to example embodiments. The access node 104 may be coupled to a backbone, network which may, for example, provide access to the Internet.

The access node 104 may wirelessly communicate with one or more mobile stations 106, 108, 110, 112, 114, 116. The mobile stations 106, 108, 110, 112, 114, 116 may communicate wirelessly with the access node 104 as well as with each other, and may include cellular telephones, smartphones, personal digital assistants (PDAs), or laptop or notebook computers, according to example embodiments. The mobile stations 106, 108, 110, 112, 114, 116 may, for example, be configured to determine their respective global positioning system (GPS) coordinates based on receiving signals from GPS satellites. While six mobile stations 106, 108, 110, 112, 114, 116 are shown in the example embodiment in FIG. 1A, any number of mobile stations 106, 108, 110, 112, 114, 116 may be included in the wireless network 102, according to various example embodiments.

The E-UTRA air interface supports both frequency division duplex (FDD) and time division duplex (TDD) modes of operation. In an example embodiment, the access node 104 and mobile stations 106, 108, 110, 112, 114, 116 may utilize an orthogonal frequency division multiple access (OFDMA) scheme or a single carrier frequency division multiple access (SC-FDMA) scheme, in which each mobile station 106, 108, 110, 112, 114, 116 is allocated a time and frequency physical resource block for communicating with the base station 104. Data may be sent and received using different modulation and coding scheme (MCS), for example quaternary phase shift keying (QPSK) and/or quadrature amplitude modulation (QAM), according to example embodiments.

Spectral resources may be assigned for each of the mobile stations 106, 108, 110, 112, 114, 116 to communicate with the access point 104 and/or with each other. The spectral resources may be divided into physical resource blocks (PRBs). The physical resource blocks may specify the fixed frequency bands such as subcarriers or blocks of subcarriers. In an example embodiment, the physical resource blocks may each include twelve subcarriers with a bandwidth of fifteen kilohertz (15 kHz) each, for 180 kHz for each physical resource block. The physical resource blocks may also allocate time slots for sending or receiving data. In an example embodiment, the base station 104 may allocate the spectral resources to the mobile stations 106, 108, 110 in physical resource blocks which each include one PRB (180 kHz) or several PRBs with whole uplink sub-frames allocation in packet arrival interval.

In the FDD mode of E-UTRA, certain carrier frequencies and/or frequency bands may be assigned for uplink communication from the mobile station(s) 106, 108, 110, 112, 114, 116 to the access node 104, and certain carrier frequencies and/or frequency bands may be assigned for downlink communication from the access node 104 to the mobile station(s) 106, 108, 110, 112, 114, 116. For example, physical resource blocks with certain frequency bands may be assigned to each mobile station 106, 108, 110, 112, 114, 116 for each of uplink and downlink communication.

In an example embodiment, the physical resource blocks used for uplink communication may, in device-to-device communication mode, be used for communication between the mobile stations 106, 108, 110, 112, 114, 116. In this example, the physical resource blocks used for downlink communication may still be available when the mobile stations 106, 108, 110, 112, 114, 116 engage in device-to-device communication, enabling the access node 104 to send messages to the mobile stations 106, 108, 110, 112, 114, 116, such as to instruct a mobile station 106, 108, 110, 112, 114, 116 to cease engaging in device-to-device communication, and communicate via the access node 104. The mobile stations 106, 108, 110, 112, 114, 116 may use the physical resource blocks previously used for uplink communication to communicate with each other in device-to-device communication mode in a time division duplexing (TDD) manner.

The mobile stations 106, 108, 110, 112, 114, 116 may, upon entering the wireless network 102, synchronize with the access node 104. The mobile stations 106, 108, 110, 112, 114, 116 may, for example, send preambles, such as random access preambles, to indicate their identity and their entrance into the wireless network 102. The access node 104 may synchronize with each of the mobile stations 106, 108, 110, 112, 114, 116 by receiving the respective preambles, and, upon receiving and processing the preambles, determine an identity of the mobile station 106, 108, 110, 112, 114, 116, and may send a response to the preamble. The response may include timing alignment information and an initial uplink grant. The initial uplink grant may, for example, include physical resource blocks for uplink communication with the access node 104, and the timing alignment information may indicate a timing pattern for when the mobile station 106, 108, 110, 112, 114, 116 should send messages.

During or after the synchronization with the access node 104, the mobile stations 106, 108, 110, 112, 114, 116 may send presence setting and/or profile elements to the access node 104. The presence setting may indicate that a mobile station allows the wireless network 102 and/or access node 104 to make its presence known to other mobile stations in the network. This allows possible use of the profile elements on the network. The profile elements may be included in profile messages sent by each of the mobile stations 106, 108, 110, 112, 114, 116 to the access node 104. The profile elements may include proposed advertisements, or information about the mobile stations' 106, 108, 110, 112, 114, 116 respective users, such as whether the user desires for his or her presence to be available to other users, the users friends or contacts, whether the user desires to receive advertisements or invitations to chat with other users, the user's age or gender, or the user's interests, such as pub crawling, purchasing inexpensive beverages, watching sports, or playing chess. These are merely examples, and other information may be included as profile elements in the profile messages. Any or all of the profile elements may be generated by the mobile stations 106, 108, 110, 112, 114, 116 based on receiving input from their respective users. Profile elements may also be available on the network in a permanent way without need for user input to send these over the air using a mobile station.

The access node 104 may compile a device-to-device group 118. The device-to-device group 118 may include any number of mobile stations 106, 108, 110, 112, 114, 116 in the wireless network 102. The access node 104 may compile the device-to-device group 118 based, for example, on determining that the mobile stations 106, 108, 110, 112, 114, 116 within the device-to-device 118 group are within a predetermined distance from each other (such as based on global positioning system coordinates transmitted from the respective mobile stations 106, 108, 110, 112, 114, 116 to the access node 104). As another example, the access node 104 may compile the device-to-device group 118 based on determining that the mobile stations 106, 108, 110, 112, 114, 116 within the device-to-device group 118 have similar timing parameters (such as timing advance parameters), which may indicate their proximity, and as a further means of establishing their proximity, may have similar Direction of Arrival (DoA) as estimated in the access node 104, which may indicate whether they are approximately on the same line of sight to the access node 104 or in the same part of access node 104 cell.

The access node 104 may also compile the device-to-device group 118 based on the mobile stations 106, 108, 110, 112, 114, 116 communicating with each other rather than with devices outside the wireless network 102. The access node 104 may also compile the device-to-device group based on the interests indicated by the mobile stations 106, 108, 110, 112, 114, 116, such as in the profile elements, which may be included in the profile messages. The access node 104 may add or remove mobile stations 106, 108, 110, 112, 114, 116 from the device-to-device group 118 based on the above or other factors, according to an example embodiment.

Figure 1B:
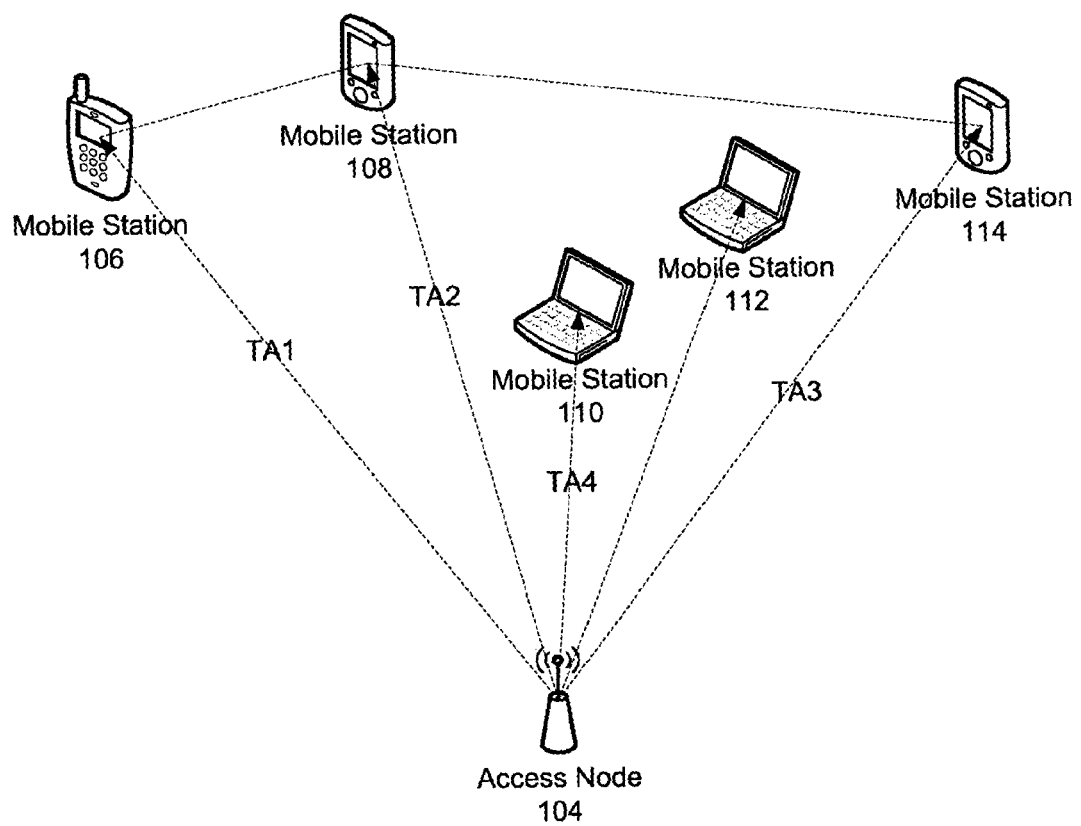
FIG. 1B is a diagram showing distances between an access node and mobile stations according to an example embodiment.

FIG. 1B is a diagram showing distances between the access node 104 and mobile stations 106, 108, 110, 112, 114, 116 according to an example embodiment. In this example, the distances and timing advances TA1, TA2, TA3 between the access node 104 and the mobile stations 106, 108, 114 are approximately the same. Based on the similar timing advances TA1, TA2, TA3, the access node 104 may determine that the mobile stations 106, 108, 114 are close to each other, and form a device-to-device group 118 which includes the mobile stations 106, 108, 114.

However, in this example, the mobile stations 106, 108 may be proximal to each other, but the mobile station 114 may not be proximal to either of the mobile stations 106, 108. Also in this example, while the timing advance TA4 of the mobile station 110 may be dissimilar to the timing advance TA2 of the mobile station 108, the mobile station 110 may be proximal to the mobile station 108. Thus, the timing advance parameters of the mobile stations 106, 108, 110, 112, 114, 116 with respect to the access node 104 may provide partial, but not complete, estimates of the distances of the mobile stations 106, 108, 110, 112, 114, 116 from each other. The timing advance parameters of the mobile stations 106, 108, 110, 112, 114, 116 with respect to the access node 104 may also provide only partial estimates of timing advance parameters between the mobile stations 106, 108, 110, 112, 114, 116 in device-to-device communication mode. The access node 104 may, for example, compile the device-to-device group 118 based on the timing advance parameters and Direction of Arrival (DoA) as estimated in the access node 104, which may indicate whether they are approximately on the same line of sight to the access node 104 or in the same part of access node 104 cell.

The access node 104 may, after compiling the device-to-device group 118, facilitate communication or advertisements between the mobile stations 106, 108, 110 in the device-to-device group 118. The access node 104 may, for example, send master profile messages to one or more of the mobile stations 106, 108, 110 in the device-to-device group 118, or to one or more of the mobile stations 106, 108, 110, 112, 114, 116 in the wireless network 102. The master profile message may include profile elements for any, some, or all of the mobile stations in the device-to-device group 118 or wireless network 102. The master profile message may include some or all of the profile elements included in the profile messages received from the mobile stations 106, 108, 110, 112, 114, 116 based, for example, on indications of whether the mobile stations 106, 108, 110, 112, 114, 116 desire to be contacted, whether the profile elements and/or proposed advertisements match, whether the mobile stations 106, 108, 110, 112, 114, 116 are included in each other's friends or contacts groups, or based on their determined proximity based on timing parameters, according to example embodiments.

The access node 104 may send the master profile message to one of the mobile stations 106, 108, 110, 112, 114, 116, which may serve as a master in a master-slave relationship, or may broadcast the master profile message to all the mobile stations in the wireless network 102, sector, or device-to-device group 108, according to various example embodiments. The access node 104 may send the master profile message based on the access node 104 receiving a service request from one or more of the mobile stations 106, 108, 110, 112, 114, 116, or based on determining that two or more of the mobile stations 106, 108, 110 should have an advertisement sent between them in a device-to-device manner or engage in device-to-device communication, such as based on a match between their profile elements. Either the access node 104 or the mobile station 106, 108, 110 may have determined that device-to-device communication is feasible, such as based on a determined distance between the mobile stations 106, 108, 110. The master profile messages may, for example, be sent separately to each mobile station in the device-to-device group 118 or the wireless network 102, or may be sent together in a single broadcast message which is sent to all the mobile stations in the device-to-device group 118 or wireless network 102.

The master profile messages may, for example, include timing advance parameters of any or all mobile stations in the device-to-device group 118 or wireless network 102. The timing advance parameters may include frame timing synchronization information, which may allow the mobile stations to synchronize with each other more quickly upon engaging in device-to-device communication and/or sending advertisements or location requests. The timing advance parameters may, for example, be based on a time lapse for messages to be sent between the access node 104 and the respective mobile stations 106, 108, 110, 112, 114, 116, and may be a function of the distance between the access node 104 and the respective mobile stations 106, 108, 110, 112, 114, 116.

In an example embodiment, the master profile messages may also include profile elements for any or all of the mobile stations 106, 108, 110, 112, 114, 116, based, for example, on indications included in the profile messages of whether the mobile stations' 106, 108, 110, 112, 114, 116 users desire for their profiles to be shared, or with whom the users desire to share their profiles. In an example embodiment, the master profile messages may also include connection identifiers of each of the mobile stations in the device-to-device group 118 or wireless network 102. The master profile messages may also assign resource blocks to the mobile stations 106, 108, 110, 112, 114, 116 for device-to-device communication, such as the resource block previously assigned to the mobile stations 106, 108, 110, 112, 114, 116 for uplink communication with the access node 104.

Upon receiving the master profile message, one or more of the mobile stations 106, 108, 110, 112, 114, 116 such as an advertising mobile station 106, may select one or more receiving mobile stations 108. The advertising mobile station 106 may determine whether it is interested in the receiving mobile station 108 based, at least in part, on their respective user profiles, the advertising mobile station's 106 proposed advertisement (such as by checking a profile element of the receiving mobile station 108 against a proposed advertisement of the advertising mobile station 106), and/or the connection identifier of the receiving mobile station 108 (such as whether the receiving mobile station 108 is included in a friends or contact list of the advertising mobile station 106).

If the advertising mobile station 106 determines that the advertising mobile station 106 is interested in the receiving mobile station 108, the advertising mobile station 106 may determine whether the receiving mobile station 108 is close enough for device-to-device communication. The advertising mobile station 106 may determine that the receiving mobile station 108 is close enough for device-to-device communication based, for example, on the timing advance parameters or other information included in the master profile message. If the advertising mobile station 106 determines, based on the information included in the master profile message, that the receiving mobile station 108 is close enough for device-to-device communication, the advertising mobile station 106 may seek further information to confirm the proximity of the receiving mobile station. The advertising mobile station 106 may, for example, send a location request message to the receiving mobile station 108, and may receive a location message from the receiving mobile station 108. The advertising mobile station 106 may determine, based on a location or distance indicated by the location message, that the receiving mobile station 108 is within a maximum advertising or communication distance. Based on this determination, the advertising mobile station 106 may send an advertisement message to the receiving mobile station 108 on a device-to-device basis, may initiate device-to-device communication with the receiving mobile station 108, or may synchronize with the receiving mobile station 108.

In an example embodiment, the advertising mobile station 106 may synchronize with the receiving mobile station 108 before requesting the location of the receiving mobile station 108, sending the advertisement message to the receiving mobile station 108, or initiating device-to-device communication with the receiving mobile station 108. The advertising mobile station 106 may send a synchronization message to the receiving mobile station 108. The advertising mobile station 106 may, for example, send the synchronization message to the receiving mobile station 108 with a low initial transmission power level based on the difference between its timing advance parameter and that of the receiving mobile station 108, as this difference may give some knowledge of propagation delay between them, or distance or path loss. The timing advance parameters received from the access node 104 may allow the mobile stations 106, 108 to synchronize more quickly, and may allow more power efficient transmission and hence lower interference than if the synchronization message were sent without knowledge of the timing advance parameters.

After sending the synchronization message to the receiving mobile station 108, the advertising mobile station 106 may wait for a synchronization acknowledgment message from the receiving mobile station 108. If the advertising mobile station 106 does not receive a synchronization acknowledgment message from the receiving mobile station 108, the advertising mobile station 106 may resend the synchronization message with a higher transmission power level. The advertising mobile station 106 may repeatedly send synchronization messages to the receiving mobile station 108 with increasing transmission power levels until receiving the synchronization acknowledgment message from the receiving mobile station 108.

Upon receiving the synchronization message from the advertising mobile station 106, the receiving mobile station 108 may send the synchronization acknowledgment message to the advertising mobile station 106 at a maximum allowed transmission power. The synchronization acknowledgment message may indicate which synchronization message is being acknowledged. Upon receiving the synchronization acknowledgment message from the receiving mobile station 108 identifying which synchronization message is acknowledged, the advertising mobile station 106 may, in an example embodiment, send a message to the receiving mobile station 108 indicating the transmission power of the synchronization message which was acknowledged. This message, which may be referred to as a "transmission power message," may also include a timing advance parameter for device-to-device communication between the advertising mobile station 106 and the receiving mobile station 108. The timing advance parameter may, for example, be based on a propagation delay of the received synchronization acknowledgment message. The advertising mobile station 106 and receiving mobile station 108 may then engage in device-to-device communication at the indicated transmission power level, according to an example embodiment.

In an example embodiment, the advertising mobile station 106 may, upon synchronizing with the receiving mobile station 108, such as in response to receiving the synchronization acknowledgment message, send a location request message to the receiving mobile station 108. The receiving mobile station 108 may, in response to receiving the location request message, send a location message to the advertising mobile station 106. The location message may indicate a location of the receiving mobile station 108 or distance from the advertising mobile station 106, which the advertising mobile station 106 may use to determine whether the receiving mobile station 108 is close enough for the advertising mobile station 106 to send an advertisement message to the receiving mobile station 108 or engage in device-to-device communication with the receiving mobile station 108. The location message may, in an example embodiment, indicate global positioning system (GPS) coordinates of the receiving mobile station 108. In another example embodiment, the advertising mobile station 106 may determine a distance of the receiving mobile station 108 from the advertising mobile station 106 based on timing information, such as a time between sending the location request message and receiving the location message.

If the advertising mobile station 106 determines that the receiving mobile station 108 is within a maximum advertising or device-to-device communication distance form the advertising mobile station 106, the advertising mobile station 106 may synchronize with the receiving mobile station 108, send an advertisement message to the receiving mobile station 108, and/or initiate device-to-device communication with the receiving mobile station 108, according to example embodiments.

Figure 2:
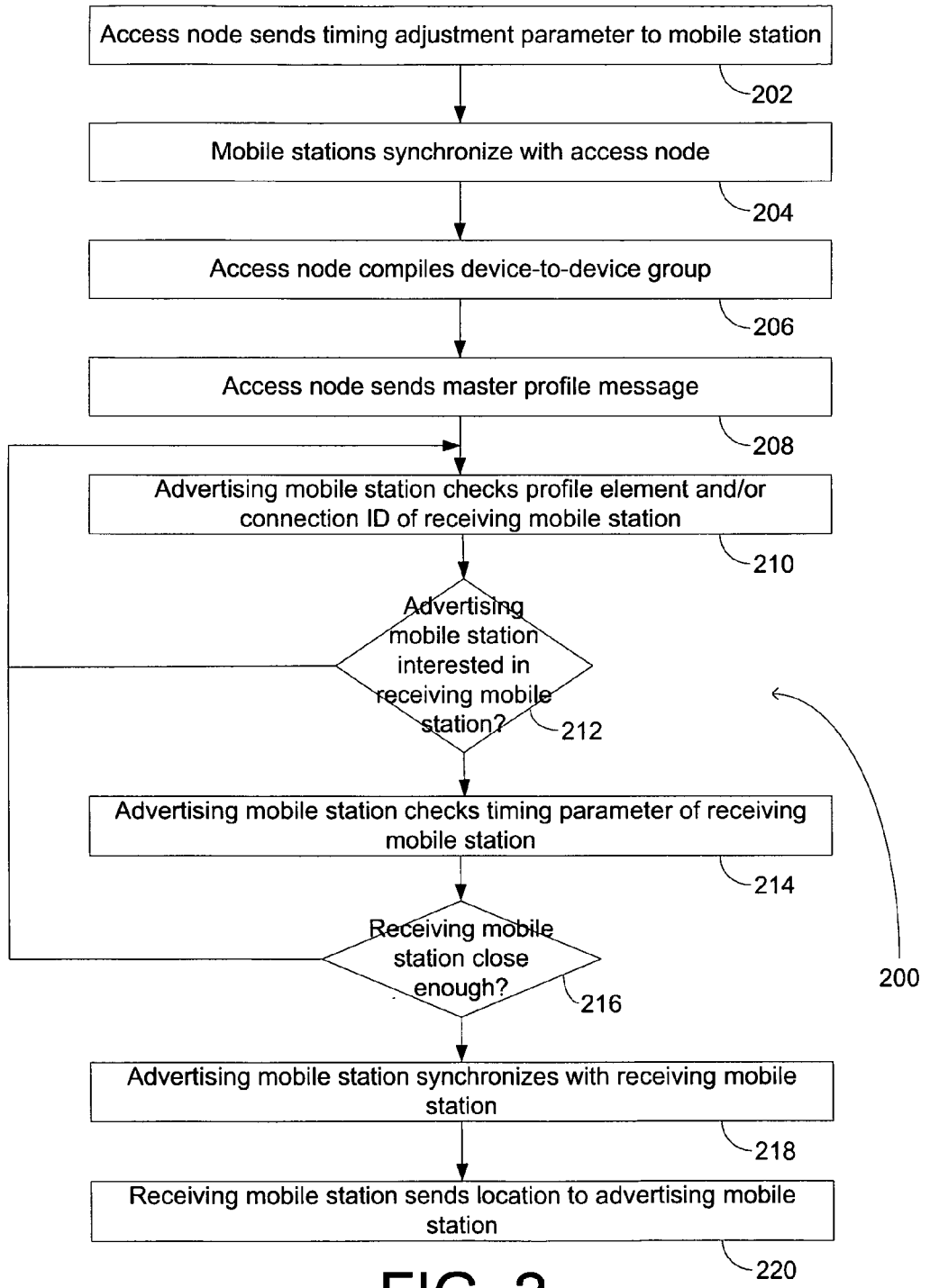
FIG. 2 is a flowchart showing functions performed by the access node and mobile stations according to an example embodiment.

FIG. 2 is a flowchart 200 showing functions performed by the access node 104 and mobile stations 106, 108, 110, 112, 114, 116 according to an example embodiment. In this example, each of the mobile stations 106, 108, 110, 112, 114, 116 may synchronize with the access node 104. The mobile stations 106, 108, 110, 112, 114, 116 may, for example, receive timing alignment information, such as timing adjustment parameters, and/or initial uplink grants from the access node 104 (202). Based on the timing alignment information, the mobile stations 106, 108, 110, 112, 114, 116 may synchronize with the access node 104 (204), such as by sending preambles to the access node 104 and receiving responses from the access node 104.

After synchronizing with the mobile stations 106, 108, 110, 112, 114, 116, the access node 104 may compile the device-to-device group 118 (206). The access node 104 may compile the device-to-device group 118 based on the mobile stations' 106, 108, 110, 112, 114, 116 determined locations, such as based on received global positioning system (GPS) coordinates, timing advance parameters, being in the same sector of a cell, or similar direction of arrival estimated using multi-antenna processing capability, according to example embodiments. The device-to-device group 118 may also be compiled based on a low mobility of the mobile stations 106, 108, 110 in the device-to-device group 118.

The access node 104 may send a master profile message to at least one, some, or all of the mobile stations in the device-to-device group 118 or wireless network 102 (208). The master profile message may signal timing parameters for any or all of the mobile stations in the device-to-device group 118 or wireless network 102, may include one or more profile elements for any or all of the mobile stations in the device-to-device group 118 or wireless network 102, and may indicate a connection identifier for any or all of the mobile stations in the device-to-device group 118 or wireless network 102. The information included in the master profile message may be based on the profile elements received from the mobile stations 106, 108, 110, 112, 114, 116, such as whether the respective users wish to be known to some or all of the other mobile stations 106, 108, 110, 112, 114, 116. The master profile message may be sent to one of the mobile stations 106, 108, 110, 112, 114, 116 which the access node 104 designates as the master which will initiate synchronization and communication with the other mobile stations designated as slaves prior to sending them the master profile message. The determination of which mobile station 106, 108, 110, 112, 114, 116 will be chosen as the master device may be based, for example, on a distance from the access node 104, a strongest link or signal strength with the access node 104, first to enter an active state in the wireless network 102, or which mobile station 106, 108, 110, 112, 114, 116 indicates a desire to send an advertisement message(s). The master device role may also be rotated among the mobile stations 106, 108, 110, 112, 114, 116 to avoid excessive battery drain or prevent one slave mobile station 106, 108, 110, 112, 114, 116 from suffering from a relatively poor link with the master mobile station.

The advertising mobile station 106 may receive the master profile message, and may check the profile element(s) and/or connection identifiers of the other mobile stations, such as the receiving mobile station 108 (210). The advertising mobile station 106 may, for example, determine whether it is interested in the receiving mobile station (212). The advertising mobile station 106 may determine whether it is interested in the receiving mobile station based, for example, on matching profile elements between the advertising mobile station 106 and the receiving mobile station 108, on whether a profile element of the receiving mobile station 108 matches a proposed advertisement of the advertising mobile station 106, and/or based on the connection identifier of the receiving mobile station 108 (such as whether the receiving mobile station 108 is included in a friends or contacts list of the advertising mobile station 106).

If the advertising mobile station 106 determines that the advertising mobile station 106 is not of interest in the receiving mobile station 108, then the advertising mobile station 106 may check the profile elements and/or connection identifiers of other mobile stations 110, 112, 114, 116 in the device-to-device group 118 or wireless network 102 (210) and determine whether the advertising mobile station 106 is of interest to the other mobile stations 110, 112, 114, 116 (212). If the advertising mobile station 106 determines that the advertising mobile station 106 is interested in the receiving mobile station 108, then the advertising mobile station 106 may check the timing parameter of the receiving mobile station 108 (214) to determine whether the receiving mobile station 108 is close enough for an advertisement or device-to-device communication (216). The advertising mobile station 106 may determine whether the receiving mobile station 108 is close enough based, for example, on comparing the timing parameter of the receiving mobile station 108 to the timing parameter of the advertising mobile station 106. If the advertising mobile station 106 determines that the receiving mobile station 108 is not close enough, then the advertising mobile station 106 may check profile elements and/or connection identifiers of other mobile stations 110, 112, 114, 116 (210).

If the advertising mobile station 106 determines that the receiving mobile station 108 is close enough, then the advertising mobile station 106 may synchronize with the receiving mobile station 108 (218). The advertising mobile station 106 may synchronize with the receiving mobile station 108 by, for example, sending a synchronization message to the receiving mobile station 108. The synchronization message may have an initial transmission power level based on the difference between the advertising mobile station's 106 timing advance parameter and that of the receiving mobile station 108. If the receiving mobile station 108 receives the synchronization message, the receiving mobile station 108 may send an acknowledgment to the first mobile station 106. The receiving mobile station 108 may send the acknowledgment to the advertising mobile station 106 at a maximum allowed transmission power level. The advertising mobile station 106 may wait a predetermined time to check whether it receives an acknowledgment from the receiving mobile station 108. If the advertising mobile station 106 does not receive an acknowledgment, then the advertising mobile station 106 may resend the synchronization message to the receiving mobile station 108, with a higher transmission power level. If the advertising mobile station 106 does receive the acknowledgment, the advertising mobile station 106 may send a transmission power message to the receiving mobile station. The transmission power message may have a transmission power which is the same as the transmission power of the synchronization message which was acknowledged, and may indicate the transmission power, as well as a timing advance parameter for communication between the advertising mobile station 106 and the receiving mobile station 108, according to an example embodiment.

After synchronization, the receiving mobile station 108 may send its location to the advertising mobile station 106 (220). The receiving mobile station 108 may, for example, send a location message to the advertising mobile station 106 in response to the advertising mobile station 106 sending a location request message to the receiving mobile station 108. Based on the location receiving from the receiving mobile station, the advertising mobile station 106 may more precisely determine the distance of the receiving mobile station, due to the limitations on determining distance based on timing parameters discussed with reference to FIG. 1B. Based on the determined distance, the advertising mobile station 106 may determine whether to send an advertisement message to the receiving mobile station 108 and/or to initiate device-to-device communication with the receiving mobile station 108, according to example embodiments.

Figure 3:
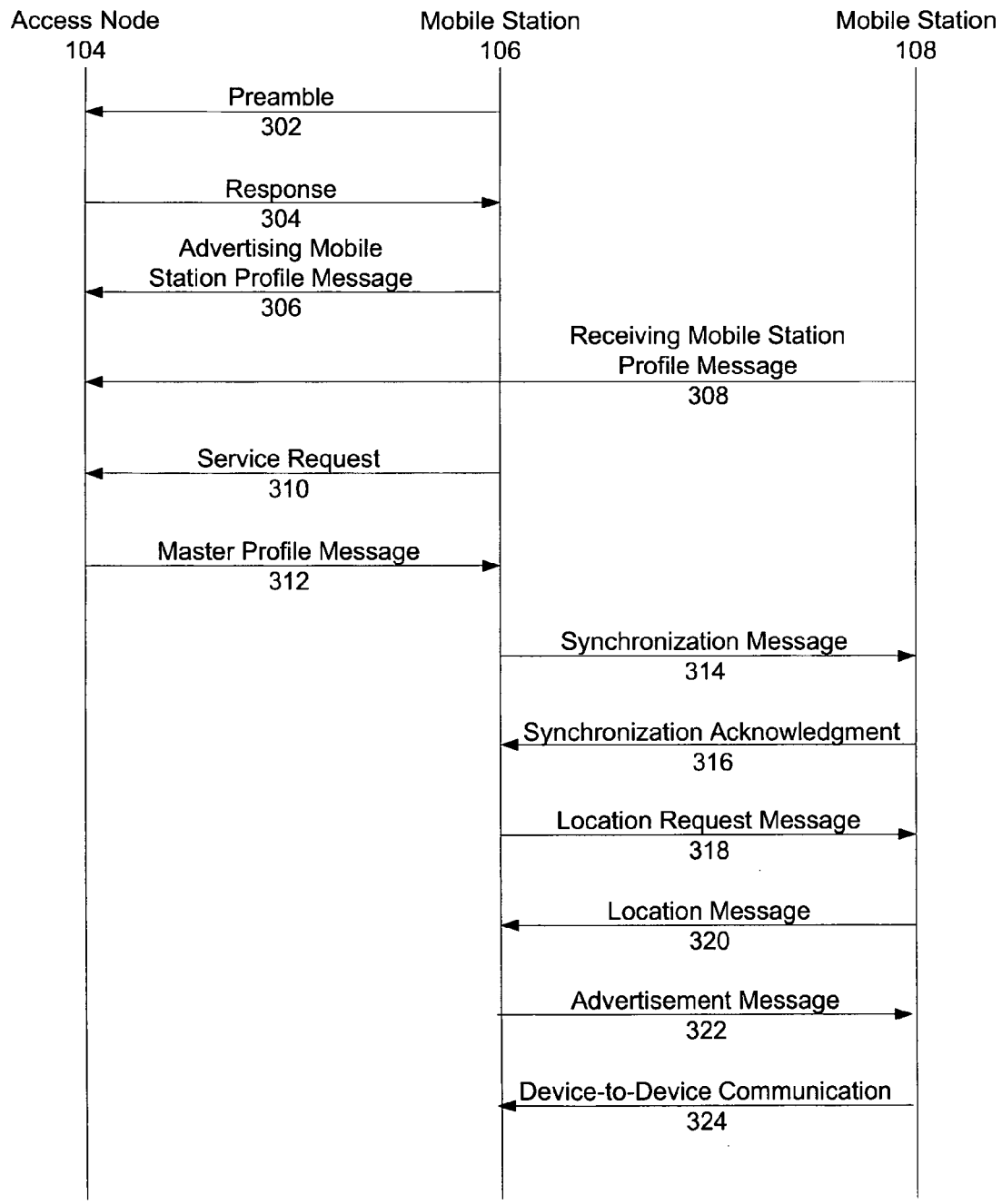
FIG. 3 is a vertical time-sequence diagram showing messages exchanged between an access node and mobile stations according to an example embodiment.

FIG. 3 is a vertical time-sequence diagram showing messages exchanged between an access node 104 and mobile stations 106, 108 according to an example embodiment. In this example, the advertising mobile station 106 may synchronize with the access node 104. The advertising mobile station 106 may synchronize with the access node 104 upon entry into the wireless network 102, or upon powering on, according to example embodiments. The synchronization may include the advertising mobile station 106 sending a preamble 302 to the access node 104, and the access node 304 sending a response 304 to the advertising mobile station 106. The preamble 302, which may include a random access preamble, may indicate the advertising mobile station's 106 identity and the advertising mobile station's 106 entrance into the wireless network 102. Upon receiving and processing the preamble 302, the access node 104 may determine an identity of the advertising mobile station 106 and may send the response 304 to the preamble 302. The response 304 may include timing alignment information and an initial uplink grant. The initial uplink grant may, for example, include physical resource blocks for uplink communication with the access node 104, and the timing alignment information may indicate a timing pattern for when the advertising mobile station 106 should send messages. While not shown in FIG. 3, these synchronization procedures may also be performed between the access node 104 and the receiving mobile station 108, or any other mobile stations in the device-to-device group 118 or wireless network 102, according to an example embodiment.

The advertising mobile station 106 may send an advertising mobile station profile message 306 to the access node 104, and the receiving mobile station 108 may send a receiving mobile station profile message 308 to the access node 104. The respective profile messages 306, 308 may include information about the respective mobile stations 106, 108 related to device-to-device communication, such as profile elements for the respective mobile stations 106, 108.

Either the advertising mobile station 106 or the access node 104 may determine that the advertising mobile station 106 should send an advertisement message(s) and/or engage in device-to-device communication with the second mobile station 108 (or any other mobile station in the device-to-device group 118 or wireless network 102). If the advertising mobile station 106 makes the determination, the advertising mobile station 106 may send a service request 310 to the access node 104. The service request 310 may indicate that the first mobile station 106 desires to send an advertisement message and/or engage in device-to-device communication with another mobile station. In response to receiving the service request 310, the access node 104 may send a master profile message 312 to the advertising mobile station 106. In an example in which the access node 104 made the determination that the mobile station 106 should send an advertisement message(s) and/or engage in device-to-device communication, or in which the access node 104 will simply provide the information to the advertising mobile station 106 and/or other mobile stations in the device-to-device network 118 or wireless network 102 (such as by broadcasting the master profile message 312), then the access node 104 may send the master profile message 312 to the advertising mobile station 106 and/or other mobile stations in the device-to-device group 118 or wireless network 102 without receiving a message from the advertising mobile station 106.

The master profile message 312 also be sent to other mobile stations in the device-to-device group 118 or wireless network 102, and may, for example, be sent separately to each mobile station, or may be sent together in a single broadcast message which is sent to all the mobile stations. The master profile message 312 may, for example, include timing parameters, at least one profile element(s), and/or connection identifiers of the mobile stations in the device-to-device group 118 or wireless network 102. The timing advance parameters may include frame timing synchronization information, which may allow the mobile stations to estimate distances from each other and/or synchronize with each other more quickly upon engaging in device-to-device communication. The timing advance parameters may, for example, be based on a time lapse for messages to be sent between the access node 104 and the respective mobile stations, and may be a function of the distance between the access node 104 and the respective mobile stations. The master profile message 312 may also assign resource blocks to the mobile stations for sending advertisement messages and/or device-to-device communication, such as the resource block previously assigned to the mobile stations for uplink communication with the access node 104.

Upon receiving the master profile message 312 from the access node 104, the advertising mobile station 106 may send a synchronization message 314 to the receiving mobile station 108. The synchronization message 314 may be based on the timing advance parameters included in the master profile message 312, such as a difference between the timing advance parameters of the advertising mobile station 106 and the receiving mobile station 108, and may be sent at a minimum transmission power level. If the advertising mobile station 106 does not receive an acknowledgment, the advertising mobile station 106 may send further synchronization messages with increasing transmission power levels, until receiving a synchronization acknowledgment 316 from the receiving mobile station 108. The synchronization acknowledgment 316 may be sent with a maximum allowed transmission power, and may indicate which synchronization message is being acknowledged. Upon receiving the synchronization acknowledgment 316, the advertising mobile station 106 may sent a transmission power message to the receiving mobile station 108. The transmission power message may be sent at the transmission power level of the successful synchronization message, may indicate this transmission power level, and may indicate timing advance parameters for communication between the advertising mobile station 106 and the receiving mobile station 108.

After receiving the synchronization acknowledgment 316, the advertising mobile station 106 may send a location request message 318 to the receiving mobile station 108. In response to receiving the location request message 318, the receiving mobile station 108 may send a location message 320 to the advertising mobile station 106. The location message 320 may indicate the receiving mobile station's 108 location or distance, such as by indicating the receiving mobile station's 108 GPS coordinates, or the advertising mobile station 106 may determine the distance of the receiving mobile station 108 from the advertising mobile station 106 based on a time between sending the location request message 318 and receiving the location message 320, according to example embodiments. If the advertising mobile station 106 determines that the receiving mobile station 108 is close enough, then the advertising mobile station 106 may send an advertisement message 322 to the receiving mobile station 108.

The process may stop after the advertising mobile station 106 sends the advertisement message 322 to the receiving mobile station 108, or the advertising mobile station 106 and the receiving mobile station 108 may thereafter engage in device-to-device communication 324. This process described between the first mobile station 106 and the second mobile station 108 may be engaged in between any number of mobile stations in the device-to-device group 118 or wireless network 102, according to an example embodiment.

Figure 4:
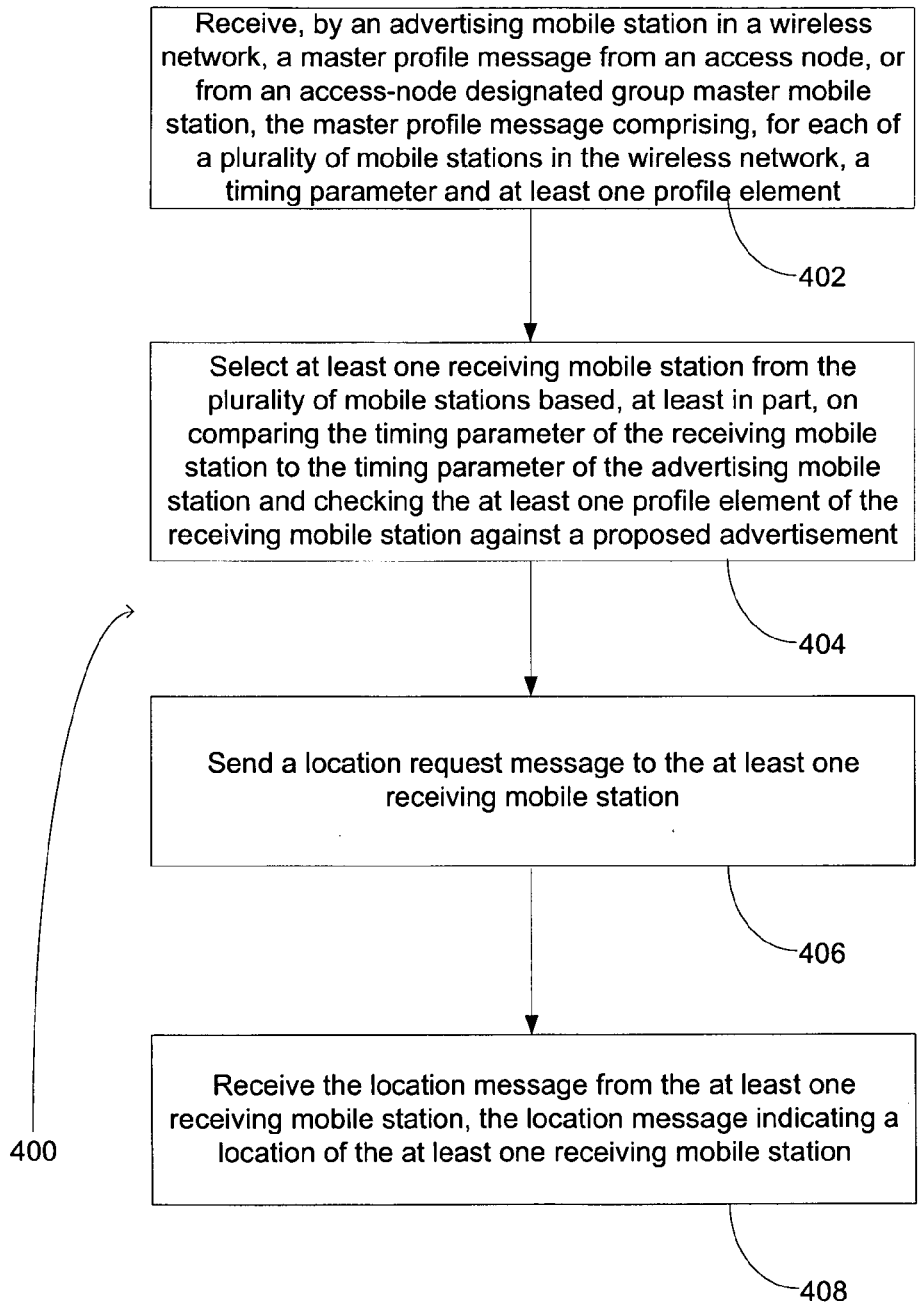
FIG. 4 is a flowchart showing a method according to an example embodiment.

FIG. 4 is a flowchart showing a method 400 according to an example embodiment. According to this example, the method 400 may comprise receiving, by an advertising mobile station in a wireless network, a master profile message from an access node, or from an access-node designated group master mobile station, the master profile message comprising, for each of a plurality of mobile stations in the wireless network, a timing parameter and at least one profile element (402). The method 400 may also comprise selecting at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement (404). The method 400 may also comprise sending a location request message to the at least one receiving mobile station (406). The method 400 may also comprise receiving the location message from the at least one receiving mobile station, the location message indicating a location of the at least one receiving mobile station (408).

In an example embodiment, the method 400 may further comprise synchronizing with the access node.

In an example embodiment, the method 400 may further comprise synchronizing with the access node, the synchronizing including sending at least one profile element for the advertising mobile station to the access node.

In an example embodiment, the method 400 may further comprise sending, to the access node, a service request message.

In an example embodiment, the method 400 may further comprise sending, to the access node, an advertising mobile station profile message, the advertising mobile station profile message including at least one profile element for the advertising mobile station.

In an example embodiment, the receiving the master profile message may comprise receiving, by the advertising mobile station in the wireless network, the master profile message from the access node, or from the access-node designated group master mobile station, the master profile message comprising, for each of the plurality of mobile stations in the wireless network, a timing parameter and at least one profile element, the timing parameter comprising a timing advance parameter. Also in this example, the selecting may comprise selecting the at least one receiving mobile station from the plurality of mobile stations based, at least in part, on comparing the timing advance parameter of the receiving mobile station to the timing advance parameter of the advertising mobile station, and checking the at least one profile element of the receiving mobile station against the proposed advertisement.

In an example embodiment, the receiving may comprise receiving, by the advertising mobile station in the wireless network, the master profile message from the access node, or from an access-node designated group master mobile station, the master profile message comprising, for each of the plurality of mobile stations in the wireless network, the timing parameter, the at least one profile element, and a connection identifier. Also in this example, the selecting may comprise selecting at least one receiving mobile station from the plurality of mobile stations based, at least in part, on comparing the timing parameter of the receiving mobile station to the timing parameter of the advertising mobile station and checking the at least one profile element of the receiving mobile station against the proposed advertisement, and the connection identifier of the receiving mobile station.

In an example embodiment, receiving the master profile message may include receiving the master profile message the master profile message comprising, for each of the plurality of mobile stations within a device-to-device group, the device-to-device group also including the advertising mobile station, the timing advance parameter and the at least one profile element.

In an example embodiment, the receiving the location message may include receiving the location message from the at least one receiving mobile station, the location message indicating global positioning system (GPS) coordinates of the at least one receiving mobile station.

In an example embodiment, the selecting the at least one receiving mobile station may comprise selecting multiple receiving mobile stations from the plurality of mobile stations based, at least in part, on comparing the timing advance parameter of the multiple receiving mobile station to the timing advance parameter of the advertising mobile station and checking the at least one profile element of each of the multiple receiving mobile stations against the proposed advertisement. In this example, the sending the location request messages may comprise sending location request messages from each of the multiple receiving mobile stations. Also in this example, the receiving the location message may include receiving location messages from each of the multiple receiving mobile stations, the location messages indicating a location of each of the multiple receiving mobile stations.

In an example embodiment, the method 400 may further comprise generating the proposed advertisement based on a user input.

In an example embodiment, the method 400 may further comprise determining, based on the location indicated by the location message, that the location of the at least one receiving mobile station is within a maximum advertising distance from the advertising mobile station. In this example, the method 400 may further comprise synchronizing, based on the determining, with the receiving mobile station for device-to-device communication.

In an example embodiment, the method 400 may further comprise determining, based on the location indicated by the location message, that the location of the at least one receiving mobile station is within a maximum distance from the advertising mobile station. In this example, the method 400 may further comprise sending, based on the determining, an advertisement message to the receiving mobile station.

In an example embodiment, the sending the location request message and the receiving the location message may be included in a synchronization process initiated by the advertising mobile station with the receiving mobile station.

In an example embodiment, the wireless network may include a Long Term Evolution (LTE) wireless network.

Figure 5:
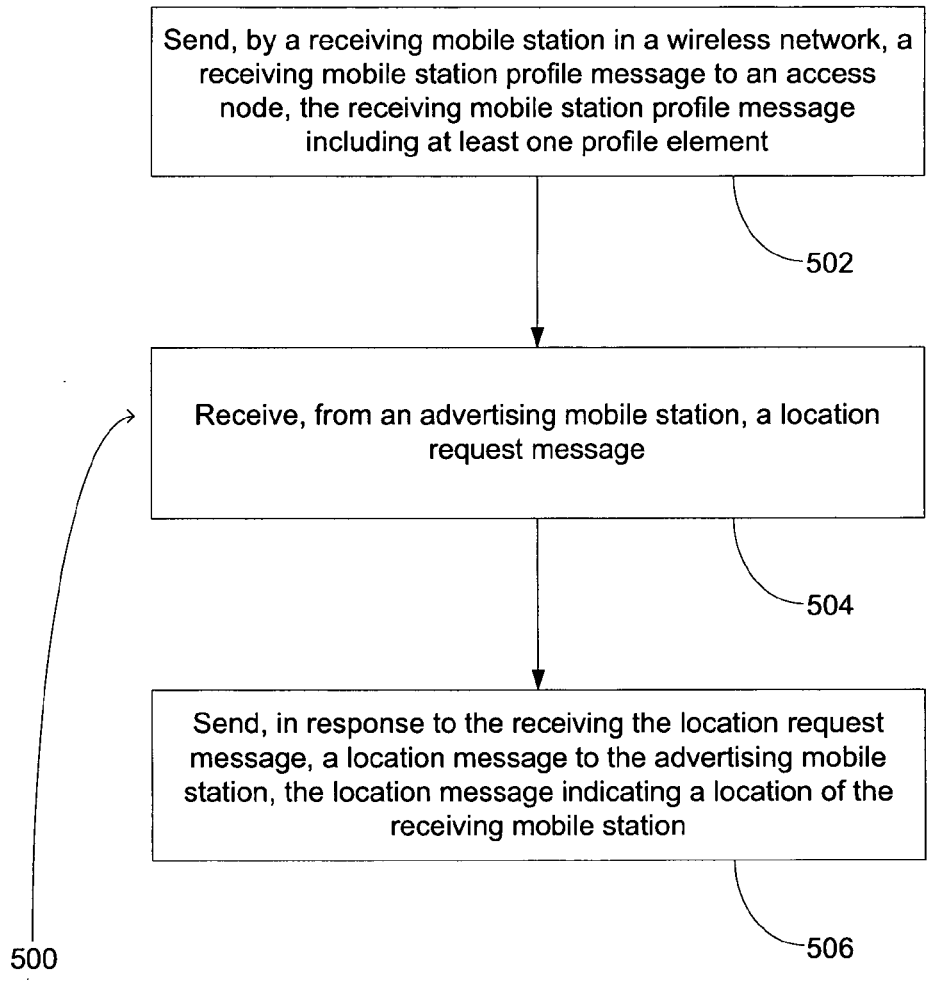
FIG. 5 is a flowchart showing a method according to another example embodiment.

FIG. 5 is a flowchart showing a method 500 according to another example embodiment. In this example, the method 500 may comprise sending, by a receiving mobile station in a wireless network, a receiving mobile station profile message to an access node, the receiving mobile station profile message including at least one profile element (502). The method 500 may also comprise receiving, from an advertising mobile station, a location request message (504). The method 500 may also comprise sending, in response to the receiving the location request message, a location message to the advertising mobile station, the location message indicating a location of the receiving mobile station (506).

In an example embodiment, the method 500 may further comprise synchronizing with the access node.

In an example embodiment, the sending the receiving mobile station profile message to the access node may be included in a synchronization process with the access node.

In an example embodiment, the method 500 may further comprise receiving a master profile message from the access node or from an access-node designated group master mobile station.

In an example embodiment, the receiving the location request message may comprise receiving the location request message, the location request message being broadcast to a plurality of other mobile stations.

In an example embodiment, the sending the location message may comprise sending the location message to the advertising mobile station, the location message indicating global positioning system (GPS) coordinates of the receiving mobile station.

In an example embodiment, the method 500 may further comprise generating the at least one profile element based on user input.

In an example embodiment, the method 500 may further comprise synchronizing with the advertising mobile station.

In an example embodiment, the method 500 may further comprise receiving an advertisement message from the advertising mobile station.

In an example embodiment, the wireless network may include a Long Term Evolution (LTE) wireless network.

In an example embodiment, the receiving the location request message and the sending the location message may be included in a synchronization process initiated by the advertising mobile station with the receiving mobile station.

Figure 6:
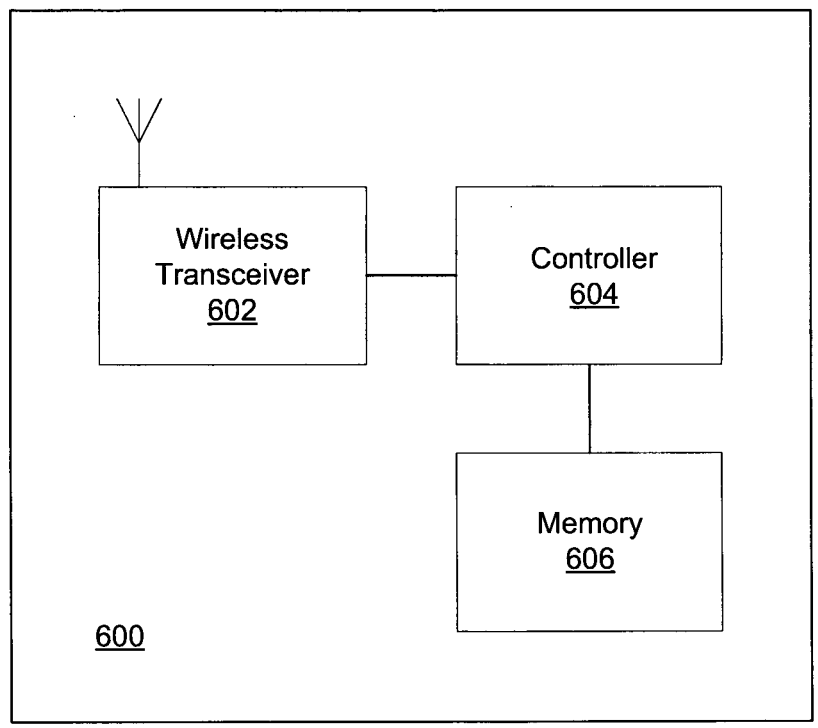
FIG. 6 is a block diagram of a wireless station according to an example embodiment.

FIG. 6 is a block diagram of a wireless station (such as an access node 104 or mobile station 106, 108, 110, 112, 114, 116) 600 according to an example embodiment. The wireless station 600 may include, for example, a transceiver (or wireless interface) 602, including a transmitter to transmit signals and a receiver to receive signals, such as a wireless transceiver configured to communicate via an air interface, a controller 604 to control operation of the station and execute instructions or software, and a memory 606 to store data and/or instructions. Controller 704 may also make decisions or determinations, generate frames or messages for transmission, decode received frames or messages for further processing, and other tasks or functions described herein.

Controller 604, which may include a processor such as a baseband processor, may be programmable and capable of executing software or other instructions stored in the memory 606 or on other computer storage media to perform the various tasks and functions described above, such as one or more of the tasks or methods described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method comprising:
receiving, by an advertising mobile station in a wireless network, a master profile message from at least one of an access node and an access node designated group master mobile station, the master profile message comprising, for each of a plurality of mobile stations in the wireless network, a timing parameter and at least one profile element;
selecting, by the advertising mobile station, at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement;
sending, by the advertising mobile station, a location request message to the at least one receiving mobile station; and
receiving, by the advertising mobile station, a location message from the at least one receiving mobile station, the location message indicating a location of the at least one receiving mobile station,
wherein the receiving the master profile message, the selecting, the sending, and the receiving the location message are performed by at least one processor.

2. The method of claim 1 further comprising sending, to the access node, an advertising mobile station profile message, the advertising mobile station profile message comprising at least one profile element for the advertising mobile station.

3. The method of claim 1, wherein the timing parameter comprises a timing advance parameter; and
wherein the selecting further comprises comparing the timing advance parameter of the receiving mobile station to the timing advance parameter of the advertising mobile station.

4. The method of claim 1, wherein the master profile message further comprises a connection identifier; and
wherein the selecting further comprises checking the connection identifier of the receiving mobile station.

5. The method of claim 1, wherein the location message indicates global positioning system coordinates of the at least one receiving mobile station.

6. The method of claim 1 further comprising:
determining, based on the location indicated by the location message, that the location of the at least one receiving mobile station is within a maximum distance from the advertising mobile station; and
sending, based on the determining, an advertisement message to the receiving mobile station.

7. An apparatus comprising:
at least one processor; and
at least one memory including a computer program code, wherein the at least one memory and the computer program code are configured, with the at least one processor, to cause the apparatus to at least:
receive a master profile message from at least one of an access node and an access node designated group master mobile station, the master profile message comprising, for each of a plurality of mobile stations in the wireless network, a timing parameter and at least one profile element;
select at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement;
transmit a location request message for the at least one receiving mobile station; and
receive a location message from the at least one receiving mobile station, the location message indicating a location of the at least one receiving mobile station.

8. The apparatus of claim 7, wherein the apparatus is further configured to at least transmit, to the access node, an advertising mobile station profile message, the advertising mobile station profile message comprising at least one profile element for the advertising mobile station.

9. The apparatus of claim 7, wherein the timing parameter comprises a timing advance parameter; and
wherein the select further comprises comparing the timing advance parameter of the receiving mobile station to the timing advance parameter of the advertising mobile station.

10. The apparatus of claim 7, wherein the master profile message further comprises a connection identifier; and
wherein the select further comprises a check of the connection identifier of the receiving mobile station.

11. The apparatus of claim 7, wherein the location message indicates global positioning system coordinates of the at least one receiving mobile station.

12. The apparatus of claim 7, wherein the apparatus is further configured to at least:
determine, based on the location indicated by the location message, that the location of the at least one receiving mobile station is within a maximum distance from the advertising mobile station; and
transmit, based on the determining, an advertisement message to the receiving mobile station.

13. The apparatus of claim 7, wherein the transmit of the location request message and the receive of the location message are part of a synchronization process initiated by the advertising mobile station with the receiving mobile station.

14. A computer program product for device-to-device communication between mobile stations, the computer program product being tangibly embodied on a non-transitory computer storage medium and comprising executable code that, when executed, is configured to cause an advertising mobile station to perform operations comprising:
receiving, by the advertising mobile station in a wireless network, a master profile message from at least one of an access node and an access node designated group master mobile station, the master profile message comprising, for each of a plurality of mobile stations in the wireless network, a timing parameter and at least one profile element;
selecting at least one receiving mobile station from the plurality of mobile stations based, at least in part, on comparing the timing parameter of the receiving mobile station to the timing parameter of the advertising mobile station and checking the at least one profile element of the receiving mobile station against a proposed advertisement;
sending a location request message to the at least one receiving mobile station; and receiving a location message from the at least one receiving mobile station, the location message indicating a location of the at least one receiving mobile station.

* * * * *